Patented Sept. 2, 1924.

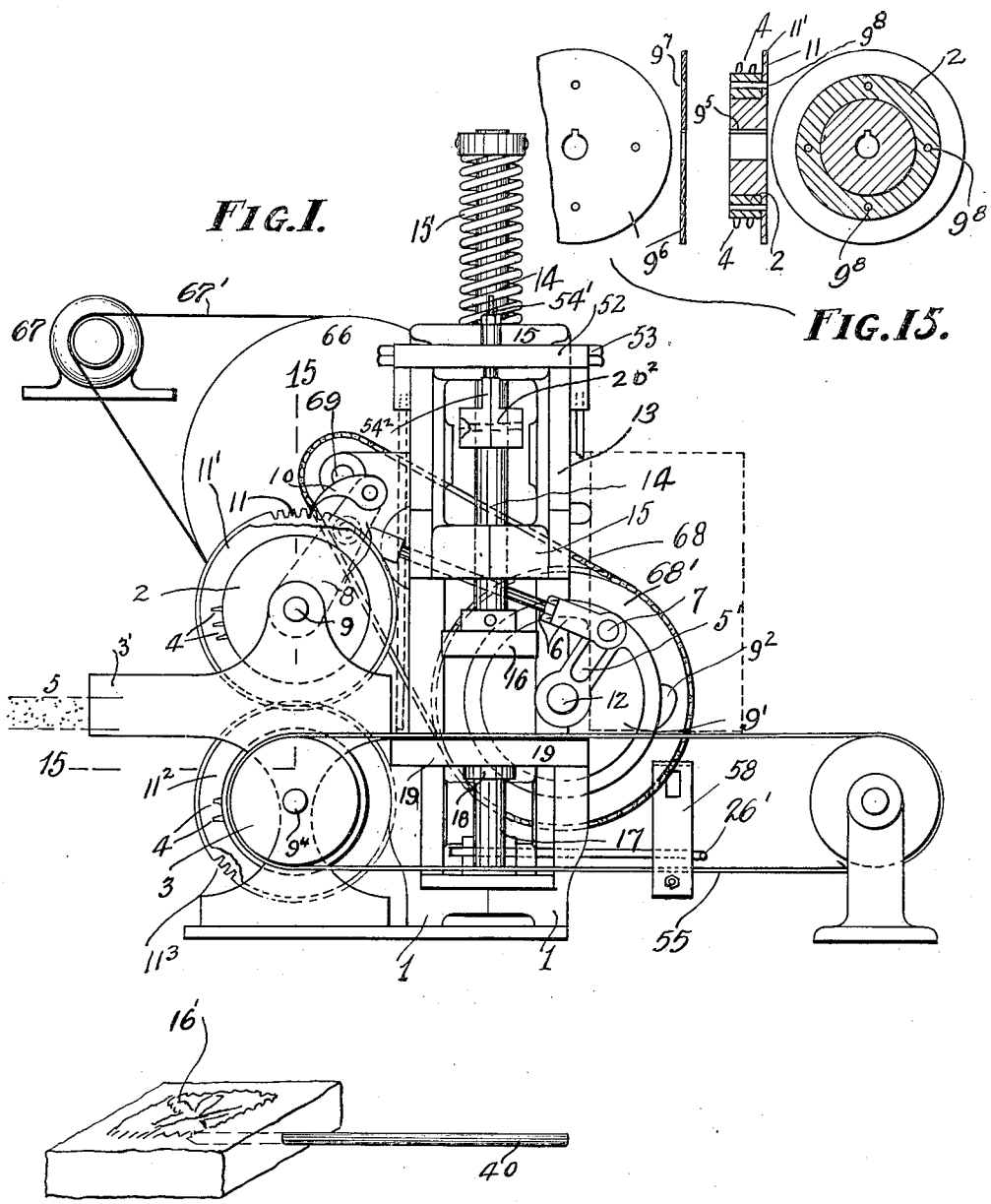

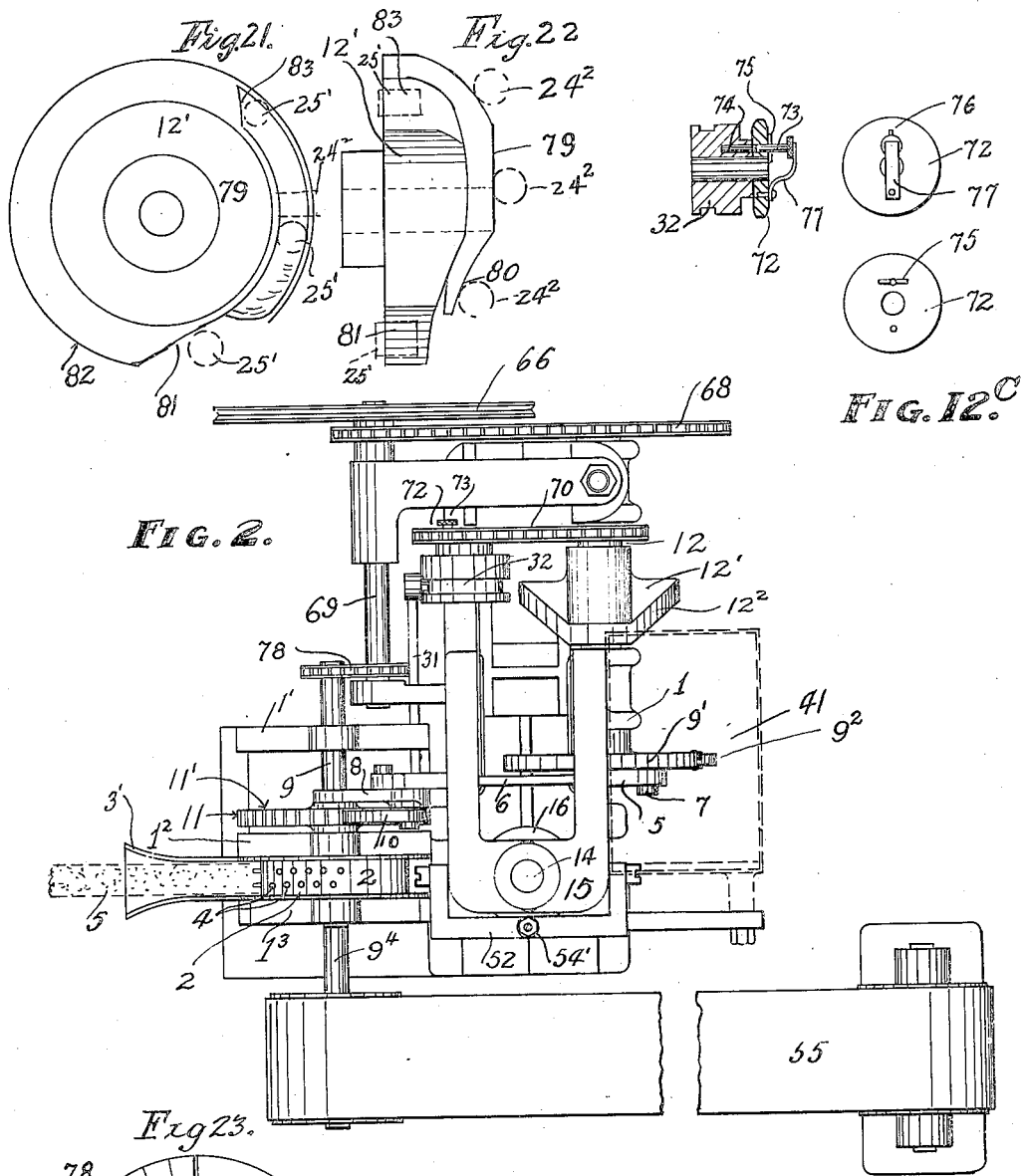
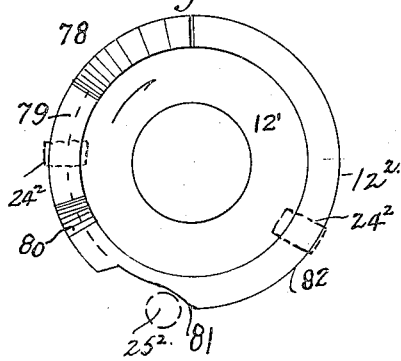

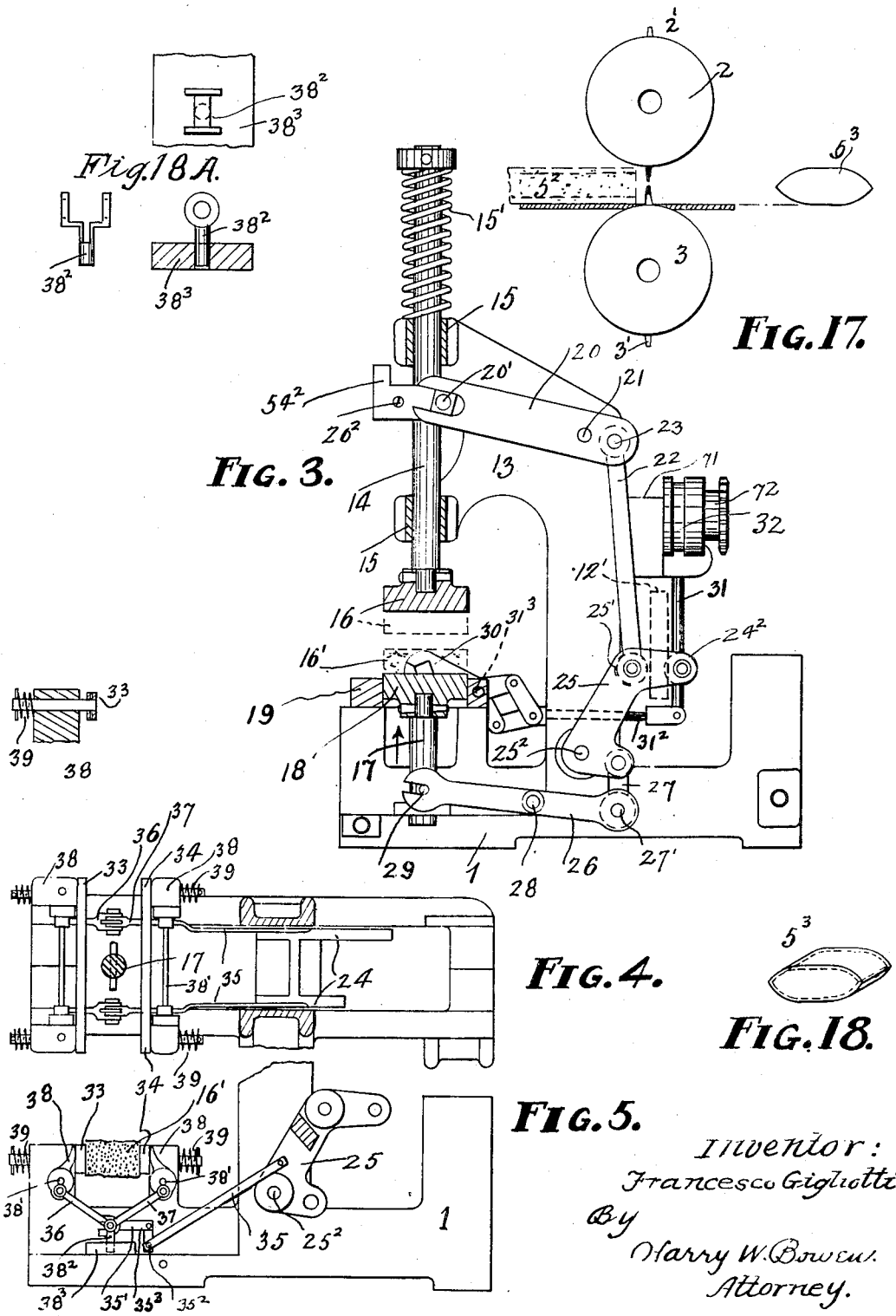

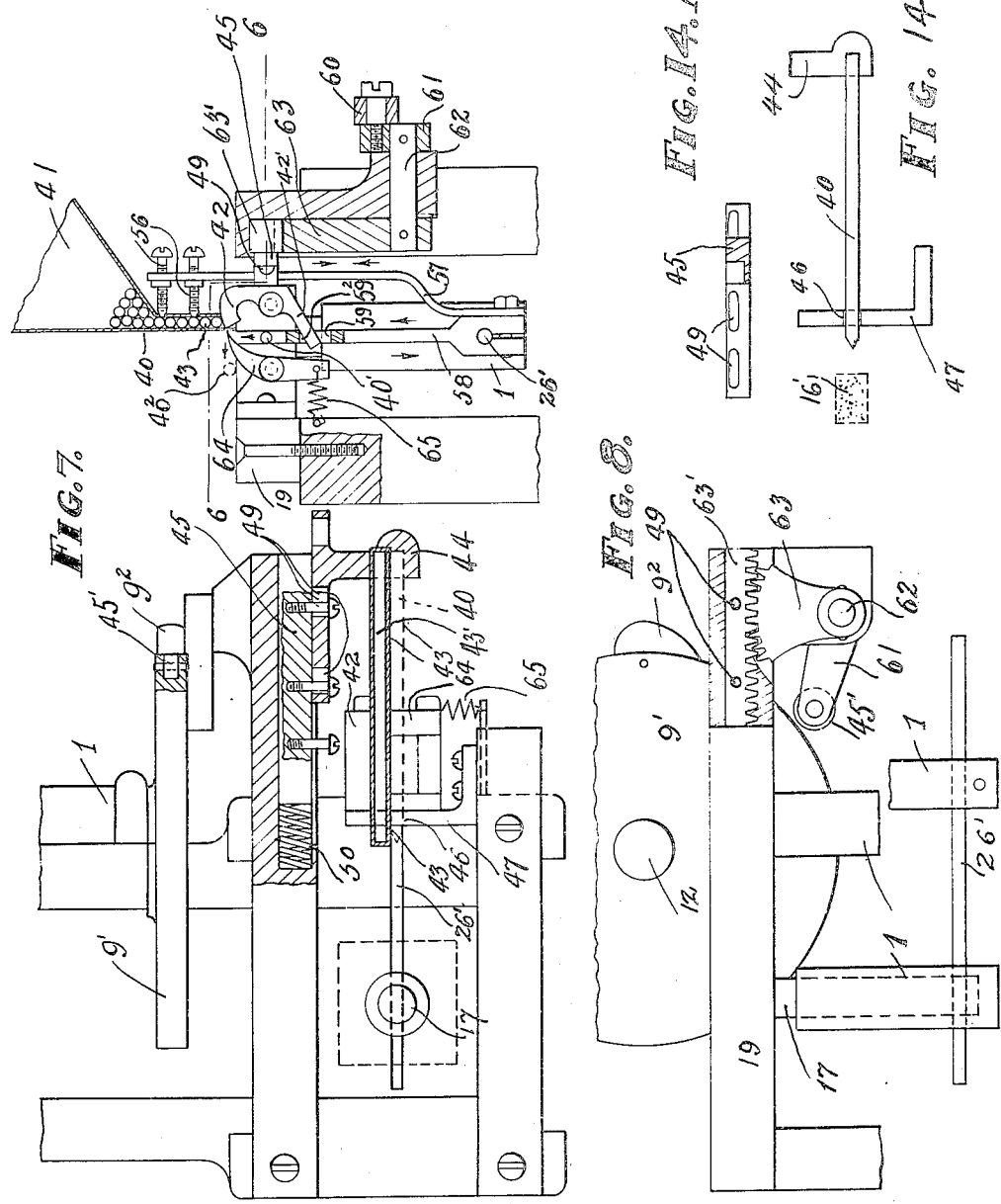

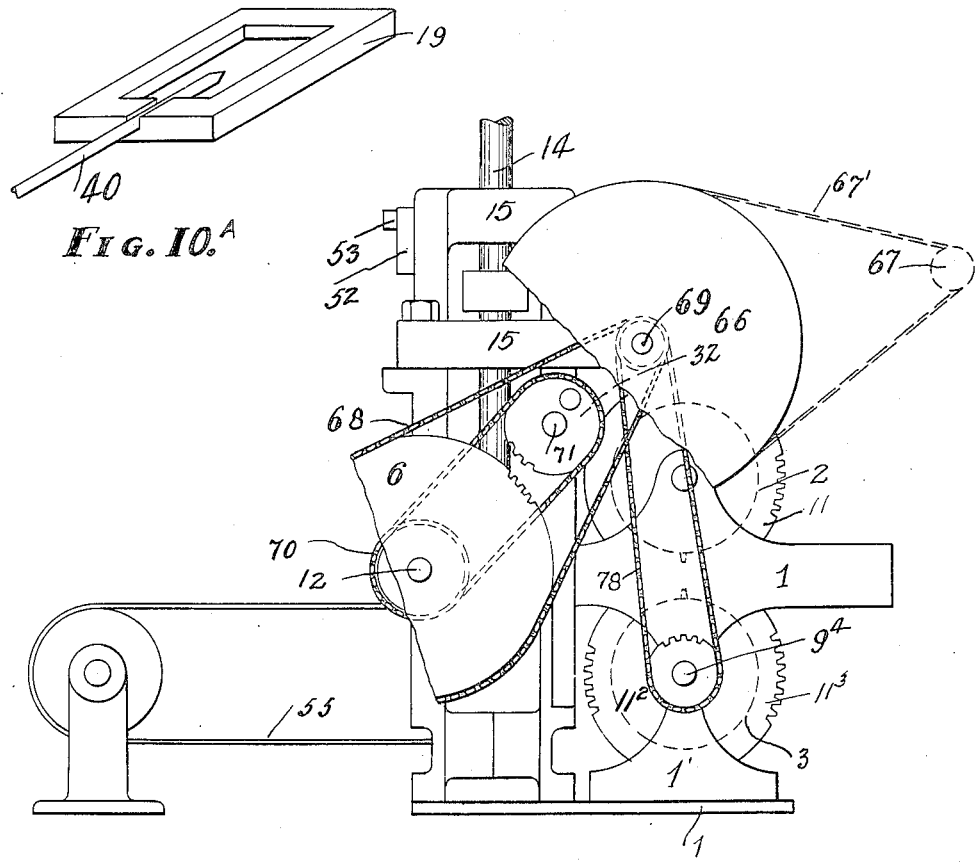

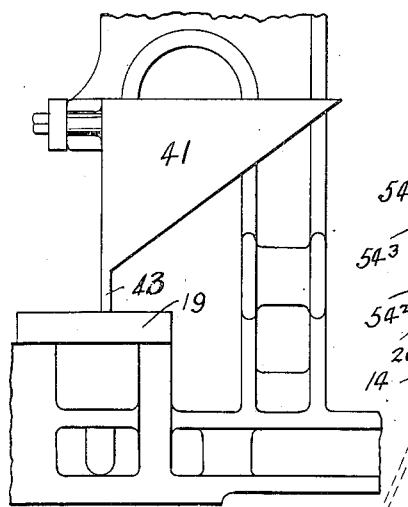
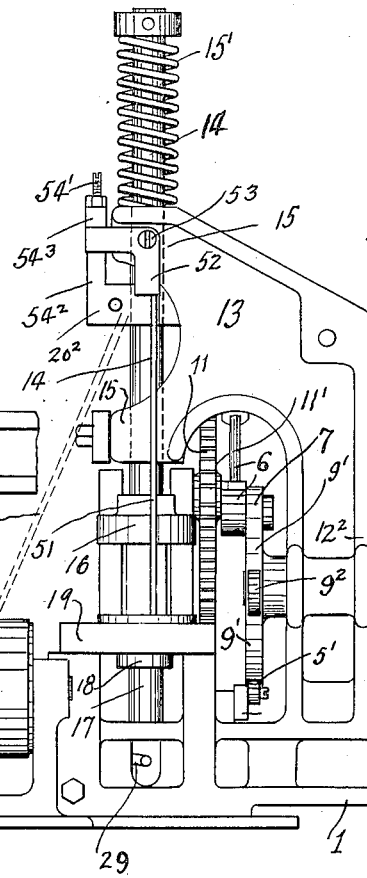
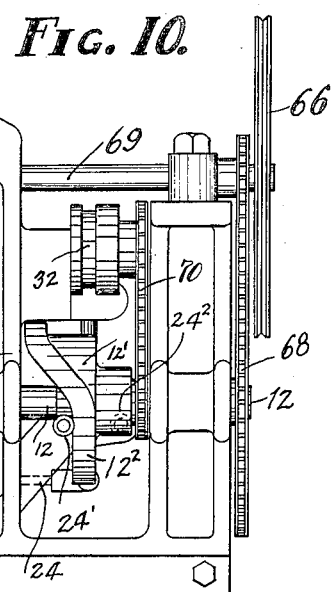
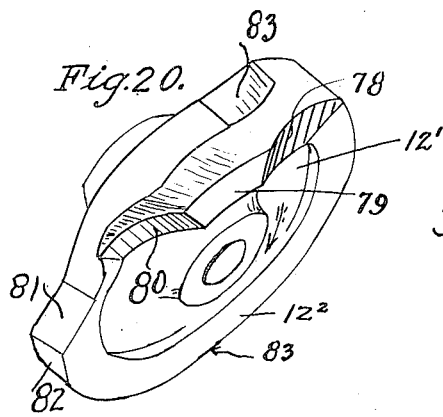

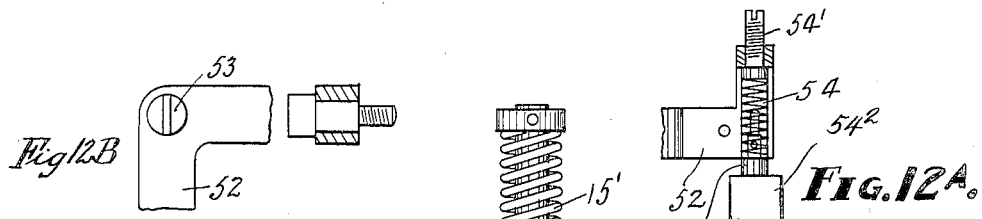
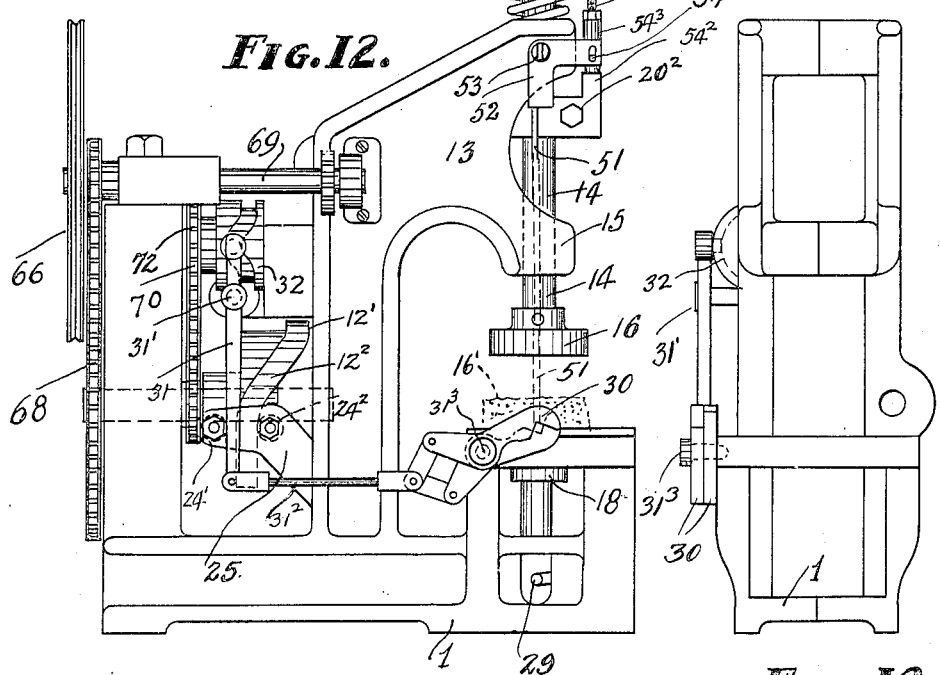
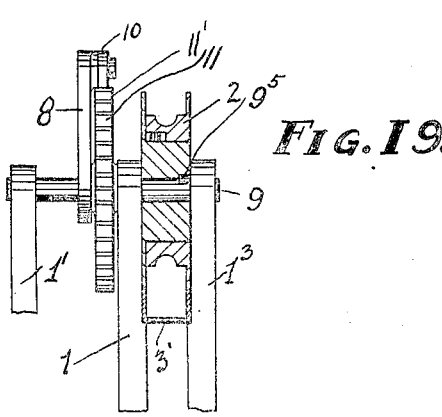

1,507,167

UNITED STATES PATENT OFFICE.

FRANCESCO GIGLIOTTI, OF SPRINGFIELD, MASSACHUSETTS.

MACHINE FOR MAKING CONFECTIONS.

Application filed April 16, 1923. Serial No. 632,397.

*To all whom it may concern:*

Be it known that I, FRANCESCO GIGLIOTTI, a subject of the King of Italy, residing at Springfield, county of Hampden, Commonwealth of Massachusetts, have invented certain new and useful Improvements in Machines for Making Confections, of which the following is a specification.

This invention relates to improvements in machines for sizing, cutting, forming, embossing or dieing confections, as candy or other like material when in a plastic or soft condition and, for inserting a stick or the like article into the formed and finished piece of confection which is a popular candy commodity at the present time.

Broadly considered, the invention relates to a machine for the purpose of automatically measuring, or predetermining the length of a piece of confection which is fed into the machine in a continuous strip and a portion is then cut off by means of suitable mechanism, giving a uniform and suitable length or quantity of the article.

Another operation is in the actuation of plunger members having suitable shaped dies attached thereto with configurations on their opposing surfaces so that the upper and lower surfaces of the piece of confection will be embossed or a suitable figure is stamped thereon while the piece of confection is retained in a clamped or pinched position by means of the plunger members. Other mechanisms are actuated for feeding a stick or holder device for the piece of confection, which is sharpened at one end and then forced into the embossed or stamped piece of confection when it is being retained or held clamped between the embossing or imprinting plunger members.

The next operation is that the plunger members are now withdrawn or separated for the purpose of releasing the piece of confection with the stick inserted therein, and then; a suitable mechanism automatically comes into operation for removing the finished article from the machine preferably onto a conveyor belt which carries the finished article to a suitable packing table or box.

One of the principal objects of the present invention is in the substitution of feeding rolls of different diameters so that different lengths of a piece of confection may be fed into the machine and cut off or severed from the main supply strip that is being fed into the machine. Heretofore in this class of machines the length of the severed pieces was fixed which prevented the insertion of the stick if the length of the piece was changed.

A suitable hopper is provided for receiving a supply of the sticks to be inserted, and means is provided for agitating or moving the supply therein so that only a single stick is fed downward at a time and placed in position for insertion into the piece of severed confection.

Referring to the drawings:

Fig. 1 is a side elevational view showing the upper and lower plunger members for clamping the piece of confection, the feed rolls with the crank adjustment for varying the throw of a pawl device which actuates the feed rolls, and the conveyer belt for carrying away the finished article.

Fig. 1^A is a perspective view of the finished article.

Fig. 2 is a plan view of the machine showing the trough or chute into which the strip of confection material to be fed is placed, the hopper for the sticks in dotted lines, the operating shafts, the conveyor belt, the driving mechanism, the pawl for actuating the feed rolls, and the cam for operating the cutting off mechanism.

Fig. 3 is a vertical view partially in section, showing the upper and lower clamping and embossing dies with their plungers for actuating the same, the link construction for actuating the plungers and the shearing or cutting off mechanism for removing a definite length of confection from the supply strip.

Fig. 4 is a plan view of a modification of the pinching or clamping mechanism for holding a piece of confection while being stamped, and when the stick is being inserted.

Fig. 5 is a side elevational view of the structure shown in Fig. 4 and illustrating a piece of confection being clamped and the dies in dotted lines above and below the same.

Fig. 6 is a plan view partially in section substantially on the line 6—6 of Fig. 7 showing the upper end of the upper plunger member, the lower or discharge end of the hopper in which the sticks are placed and the mechanism for operating the push rod for pushing a stick forward towards the plunger and into a clamped piece of confection.

Fig. 7 is an end elevational view partly in section, showing the feed and removing mechanism for the sticks in the hopper, the shaker for causing the sticks to be fed downward in a single row and to prevent their becoming clogged in the delivery throat of the hopper, also the latch or pivoted gate mechanism for removing one stick at a time, and another or safety latch for preventing a stick from interfering with the feeding of the sticks in the hopper.

Fig. 8 is a detail side elevational view of the cam wheel and the rack and pinion for operating the mechanism for inserting a stick into a piece of confection.

Fig. 9 is a side elevational view of the driving mechanism of the machine viewed from the opposite side of Fig. 1 showing the driving connections.

Fig. 10 is an elevational view showing the machine at the discharge end, also showing the main operating cam; the driving mechanism and the ejector rod for removing the finished article and means for operating the same.

Fig. 10$^A$ is a detail view of one form of the die with a stick supported thereon.

Fig. 11 is a detail view of the hopper shown in side elevation and a portion of the main frame.

Fig. 12 is a view of the cam mechanism for operating the shears or cutting device which severs the piece of candy from the main strip.

Fig. 12$^A$ is a detail view of the part that removes the finished article and showing a device for disconnecting the cam.

Fig. 12$^B$ is a detail view of the part shown in Fig. 12$^A$.

Fig. 12$^C$ is a detail view of a clutch which will be referred to hereinafter.

Fig. 13 is an end view of Fig. 12 looking from the right, showing the shears and the cam for operating the same.

Fig. 14 is a detail view of the device which receives and pushes the stick to be inserted toward the severed piece of confection.

Fig. 14$^A$ is a detail view of a part of the stick pusher.

Fig. 15 is a detail view of the removable parts of one of the feed wheels.

Fig. 16 is an end view of the trough and feed wheels.

Fig. 17 is a detail of a modification of the feed wheels showing a cutting off mechanism.

Fig. 18 is a perspective view of the severed piece of confection.

Fig. 18$^A$ are detail view of parts of the presser mechanism of Fig. 5.

Fig. 19 is a view of a modification of one of the feed rollers.

Figs. 20, 21, 22, and 23 are detail views of the main cam.

Referring to the drawings in detail:

1 designates the base and main frame part of the machine, 2 and 3 the feed rolls which are provided with pins 4 for engaging the strip of candy. These pins are for the purpose of engaging the strip of molded confection, indicated by the dotted lines 5, for feeding or moving the same forward into the machine along the trough 3'. The angular throw of these feed rolls 2 and 3 is varied by means of the slot 5' in the disk wheel 9' on the main shaft and in which slot one end of the connecting rod 6 is located. The connecting pin 7 is placed at different radial distances in the slot 5' to vary the angular throw of the arm 8. This arm is attached to the rod 6 and swings or oscillates on the shaft 9. 10 is a pawl (see Fig. 1) which is pivotally attached to and carried by the arm 8. This pawl engages the teeth 11 of the wheel 11' which is attached to the shaft 9. This pawl serves to actuate the feed rolls 2 and 3. The teeth 11 of the wheel 11' engage teeth 11$^3$ on the lower wheel 11$^2$ which is connected to the shaft 9$^4$ (see Fig. 16) and serves to drive the lower feed roll 3. These two rolls therefore turn in opposite directions to feed the strip 5 of confection into the machine. The feed rolls 2 and 3 are made removable and in different sizes as shown and will be explained in connection with Fig. 15. The wheels 11' and 11$^2$ are keyed to the shafts 9 and 9$^4$. The key is indicated at 9$^5$ in Fig. 19. The ring part 2 is removable. It is retained in place by means of the plate 9$^6$ by passing screws through the openings 9$^7$ of the plate 9$^6$ and into the threaded openings 9$^8$. The rolls 2 and 3 turn with the shafts 9 and 9$^4$ in the parallel arranged uprights 1'; 1$^2$; and 1$^3$. The shaft 9$^4$ drives the belt conveyor 55 which carries away the finished confection when the rolls are actuated.

The main operating shaft is indicated at 12 which is driven by the belt 68 from the shaft on which the wheel 66 is mounted and is belted to a motor 67 by the belt 67' (see Fig. 9). The wheel 66 is secured to the shaft 69. Located in the upper frame part 13 of the machine is a plunger rod 14 that reciprocates in the bearings 15 of the main frame. A spring 15' is employed for balancing the weight and to assist in returning this plunger to its upward position. 16 designates the upper die or embossing plate on the lower end of the plunger rod 14. On this plate a design is formed for impressing a suitable figure on the upper surface of a piece of confection (see Fig. 1ᴬ) indicated in dotted lines in Figs. 3, 5, and 10 at 16′. 17 designates the lower plunger carrying the die 18 which moves through the die plate or holder 19 (see Fig. 10ᴬ) which is secured to the main frame. The mechanism for operating the two plungers 14 and 17 is shown in Fig. 3. The plunger 14 is actuated by the link 20 which is connected thereto by means of the pivoted nut connection 20′, which is carried by a part that is clamped to the plunger 14 by the screw 20² see Figs. 1, 3, and 12. The link 20 is pivoted at 21 to the main frame and is pivotally connected to a link 22 at 23; its lower end is attached to a bell crank lever 25 at 25′. This lever 25 is pivoted to the main frame at 25². The plunger 17 is actuated from the bell crank 25 by a link 27 which is connected to a lever 26 at 27′. This lever is pivotally connected to the main frame at 28. The lever 26 is connected to the lower plunger 17 by means of the slot and pin connection 29. For operating the bell crank lever 25 a cam 12′ (see Figs. 3, 10, 12, 20, 21, 22, 23) on the main shaft 12 is provided which is formed with a curved flange 12². This flange passes between the two rollers 24′ and 24² on the bell crank lever 25 (see Fig. 10), whereby when this cam is driven, the bell crank lever 25 will oscillate or rock about its pivot 25². This will cause the upper and lower plunger members 14 and 17 to reciprocate in the same direction simultaneously, but the upper plunger 14 will travel faster than the lower one 17 with the result that the piece of fed confection is caught as it is fed forward by the rolls 2 and 3 and pinched or retained between the two dies 16 and 18 see Fig. 3.

For severing a piece of confection from the strip 5 a cut off mechanism is employed as indicated in Figs. 3, and 12, at 30. This is actuated by means of the lever 31 pivoted to the frame at 31′ and which is operated by the cam 32 (see Fig. 12). A rod 31² connects the lever 31 and the jaws of the shears 30 that are pivoted to the frame at 31³. The cutting off mechanism is actuated when the plungers are at rest. Altho a positive cut-off as shown at 30 may be used I do not wish to limit myself by this disclosure as I have found by experiment that the plunger 16 may itself act as the cut-off when it descends to pinch and retain the candy.

As a modification of the clamping mechanism shown in Figs. 3 and 4 laterally movable clamping jaws or plates 33 and 34 may be used to retain the piece of confection while being embossed by the dies 16 and 18. These are actuated as before by the bell crank lever 25 which is identical in construction and operation with that shown in Fig. 3. A link 35 is pivoted to a bell crank lever 35¹ at 35² which is pivoted to the frame at 35³. This lever actuates the two links 36 and 37 which in turn actuate the fingers 38 which are pivoted at 38′ and engage the confection clamping plates 33 and 34 which cooperate with the dies 16 and 18. Springs 39 automatically return the plates 33 and 34 to their open position. A rod 38² is connected to the arms 36 and 37 and reciprocates in the recessed block 38³. The flange 12² of the cam 12′ is so shaped that a rest period occurs when the clamping dies 16 and 18 are down as shown in Fig. 3 and after the severing mechanism 30 is operated. The same rest period occurs when the plates 33 and 34 are pinching the candy. Plates 33 and 34 not only pinch and compress the candy thereby imparting any desired design to the sides thereof, but also serve to force the candy more firmly into the designs formed on plunger 16. In practice the operating links for plates 33, 34 are so connected to bell crank lever 25 that said plates start their compression stroke with or slightly after the downward stroke of plunger 16 begins. At this point in the operation of the machine one of the sticks 40 (see Fig. 7) in the hopper 41 is removed by means of the pivoted cut off lever or latch 42 permitting the lower most stick 40 to fall downward through the narrow throat part 43 of the hopper and into the stick pusher receiving member 44 indicated by the stick 40 shown in dotted lines in Fig. 6, one end of the stick resting in the stick pusher receiving member 44 and its other or sharpened end resting in the groove or channel 46 of the bracket piece 47 (see Fig. 14). This gives a support for the two ends of the stick 40 whereby when the pusher rod 45 is actuated by the cam 9² (see Fig. 8) on the disk 9 engaging the roller 45′ (see Fig. 8) the stick will be pushed through the opening 46 in the bracket 47 and into the piece of candy indicated at 16′. The throw of the pusher rod 45 is adjusted by means of the bolt and slot connection 49 see Fig. 7. The expansion spring 50 returns the stick pusher 45. This operation is understood to take place when the die plates 16 and 18 retain the candy in a pinched or clamped position. After the return of the pusher rod and the stick having been inserted in the candy the dies 16 and 18 are separated by the action of the cam 12′ assisted by the spring 15′ and the parts connected thereto thus releasing the hold on the piece of confection. At this point in the operation the ejector mechanism comes into action for removing the finished article. This is shown in Figs. 10, 12 and 12ᴬ which comprises a rod 51 the upper end of which is connected to a bell crank lever 52 that is pivoted to the main frame at 53. Located within the part 52 is the spring 54, the upper end of which is engaged by the tension adjusting screw 54′. Located below the spring 54 is a plunger 54⁴ which is retained in place by the slot and pin construction 54⁵. The part 54² which is clamped to the plunger 14 when the plunger 14 travels upward strikes the plunger 54⁴ of the bell crank lever 52 causing the rod 51 to be moved laterally and push the finished piece of confection laterally onto the conveyer belt 55 (see Fig. 10) where it is carried away from the machine ready for packing, when the plunger 14 moves downward again the ejector rod returns to its normal vertical position by the force of gravity.

For the purpose of causing the sticks 40 to pass down through the throat of the hopper, pins or agitating points 56 project into the throat of the hopper shown in Fig. 7. These pins have a vertical movement which causes them to separate the sticks. The pins are connected to a rod 57 the lower end of which is connected to a rod 58 which is attached, by means of the rod 26' to the lower plunger 17 and therefore moves up and down with the same. This rod is formed with a shoulder 59 which actuates the stick cut off and removing lever 42. When the rod 58 is elevated by the lever 26' (which as shown in Fig. 1, is a continuation of pin and slot connection 29), the stick cut off lever 42 rocked on its pivot 42' is moved away from the lower end of the chute 43 permitting the lowermost stick to fall downward and out the lower end of the throat 43, onto the stick pusher 45 as indicated at 44, in Fig. 6. This stick is shown in Fig. 10ᴬ with one end resting in a groove in the die holder 19. The stick is now moved towards the piece of confection 16' by means of the cam 9² on the disk wheel 9' engaging the roller 45' see Fig. 8, which is on the end of the arm 61 that is attached to the shaft 62. This shaft is attached to a pinion 63 that meshes with the rack 63' that carries the stick pusher 44. The rack 63' is adjusted by means of the bolt and slot adjustment 49 for adjusting the stick pusher. When the rod 58 is lowered the edge 59ᵉ strikes the arm 42' of the stick cut off lever 42 and closes the throat 43 of the hopper 41. A safety latch 64 is normally retained in the position shown by means of the spring 65. The forward upper end of the lever 42 normally rests against the side of the hopper 41 as shown. When the part 58 is elevated a stick 40; which is now in the position shown in Fig. 10ᴬ and at 40', Fig. 7 is pushed upward past the upper end of the latch 64 against the tension of the spring 65 into the position shown at 40². By reference to Fig. 1, it will be understood that this elevation of part 58 occurs after the stick has been inserted into the candy and at the time that plunger rod 17 is elevated prior to the ejection of the candy from the machine. It is now ready to be ejected from the machine by the rod 51 shown in Fig. 10 which is actuated by the plunger 14 on its upward stroke, when the part 54² engages the part 54⁴ (see Fig. 12ᴬ). The stick 51 is now turned about the pivot pin 53.

The main pulley 66 is driven from a suitable motor indicated at 67. This pulley through its sprocket chain 68 and pulley 68' drives the main shaft 12 on which the cam 12' and cam disk 9' (see Figs. 1 and 2) are placed. The pulley 66 is secured to the shaft 69. 70 designates a sprocket chain connecting the shaft 12 with the shaft 71 on which the cam 32 is mounted see Fig. 9. This cam operates the cutting off shears 30 as described. The chain 70 passes over a sprocket wheel 72 (see Figs. 2 and 12). A pin 73 on the wheel 72 enters a recess 74 in the cam 32 whereby the cam is driven. When the pin is withdrawn the sprocket wheel 72 runs idle. The pin is retained in its inoperative position by means of a cross pin 75 entering a recess 76 in the sprocket wheel 72.

A spring 77 (see Fig. 12ᶜ) is for the purpose of holding the pin 73 in the recess 74 in its operative and inoperative positions. When the cam 32 is inoperative by withdrawing the pin 73 the shears 30 are not then operated and the feed rollers 2 and 3 simply feed the strip of candy material 5 through the machine. The feed rollers 2 and 3 are then provided with a registering and cutting off or pinching devices 2' and 3' as shown in Fig. 17, to engage a tubular strip of candy 5² which may be filled with some soft material which simply pinches or closes the ends of the tube as shown in Figs. 17 and 18. The severed piece of filled candy is shown at 5³. In this arrangement the sprocket chain 78 (see Figs. 2 and 9) drives the shaft 9, the feed rolls 2 and 3 the conveyor 55 by means of the meshing gears 11 and 11³, see Fig. 1. The main shaft 12 is now being driven and the pawl 10 idly drops from one tooth to the next on the wheel 11.

Referring to the construction of the main cam 12' shown in Figs. 2, 10 and 12 which operates the bell crank lever 25 which in turn, through the link mechanism shown in Fig. 17 operates the plungers 14 and 17 which carry the dies 16 and 18. The flat surface 12² on the side of the cam 12' on which the roller 24² of the bell crank lever travels, as the main shaft 12 is rotated passes up along the inclined surface 78 causes the two plungers to approach each other. When the roller 24² reaches the elevated flat surface 79 or the highest part of the circular flat surface 12, then the die parts 16 and 18 will grip or pinch the piece of confection therebetween as shown in Fig. 3. The elevated flat surface 79 causes a dwell or rest in the extreme inward movement of the dies and of the plungers so that they remain stationary during the time that the stick pusher 44 operates to insert a stick 40 into the piece of confection 16'.

As the cam 12' continues its rotation the roller 24² passes onto and down the inclined surface 80 and when this roller leaves the surface 80 or becomes inoperative a second roller 25' on the bell crank lever 25 engages the inclined surface 81. This surface causes the bell crank lever 25 to move in the opposite direction and separate the plungers 14 and 17 and the dies 16 and 18. When the roller 25' reaches the surface 82 which is concentric with the axis, of the shaft 12, the piece of confection 16' is elevated into the dotted line position shown in Fig. 3. The ejector mechanism now comes into operation and the rod 51 (see Fig. 10) removes the confection from the plate 19 with a stick 40 inserted therein, onto the conveyor belt 55, also during the time that the roller 25' is engaging the concentric surface 82 the feed rollers 2 and 3 are moving a new piece of confection into the machine. This continues until the roller 24² again reaches the inclined surface 78. At this point the roller 25' passes down the inclined surface 83, whereby the outward travel of the plungers is reached. At this point the roller 24² again comes into operation and passes up the surface 78 when the operation is repeated.

What I claim is:

1. In a machine for the purpose described, the combination with a clamping plunger which is movable for clamping a piece of candy material of means for feeding candy under the plunger, means for actuating the plunger, the actuating means having a period of rest, or dwell during the clamping operation, means for severing the article to be clamped, a hopper to receive sticks therein which are designed to be inserted into the finished article and means for feeding the sticks toward the finished article during the clamping operation said stick feeding mechanism being located in the path or line of travel of the article and means for removing the finished article after the clamping mechanism releases the article.

2. In a stick feeding mechanism for the purpose described, a hopper for receiving the sticks, agitating devices for causing the sticks to be fed downward one at a time, a stick pusher mechanism located below the discharge end of the hopper, a device for supporting the forward end of the stick when the same is moved toward the article into which it is to be inserted, the pusher mechanism being located in the longitudinal line of travel of the article.

3. In a machine of the type described, the combination, of a single pair of feed rolls for feeding a continuous strip of the confection to the machine, said rolls being formed with projections for engaging the strip, means for intermittently actuating the rolls, means for severing pieces of the confection from the strip and means including oppositely movable dies for simultaneously clamping the severed strip to impart a design thereto.

4. In a machine of the type described, the combination of a pair of feed rolls for feeding a strip of confection to the machine, said rolls being formed with projections to engage the strip, means for intermittently actuating the rolls, means for severing a portion of the confection from the strip, means including oppositely movable dies for simultaneously clamping the severed strip, and means for inserting a stick like article into the confection while in a clamped position.

5. In a machine of the type described, the combination with a pair of plungers, means for actuating the plungers, for clamping a piece of confection and means for momentarily retaining the plungers in a clamping position, said means including a main drive shaft, a cam thereon, a bell crank lever common to the pair of plungers, and operated by the cam, connecting mechanism being so constructed that one plunger travels faster than the other and in the same direction.

6. In a machine of the type described, the combination with a pair of clamping devices to retain a piece of confection, means for inserting a stick like article into the confection while in a clamped position, said means including a hopper into which said sticks are located, a cut off member for closing the outlet of the hopper and actuated from the plunger actuating mechanism, a device for inserting the stick into the confection including a reciprocating member and a rack and pinion device for actuating said member.

7. In a machine for the purpose described the combination, with a hopper for receiving a supply of sticks designed to be inserted into a piece of confection, a delivery throat for the sticks, an agitator in the throat for causing the sticks to fall in a single row down the delivery throat, a latch member for controlling the delivery of sticks from the hopper and operatively connected to the agitating mechanism and a second spring controlled latch designed to be directly operated by the stick after it is inserted in the piece of confection and just before its removal from the machine, as described.

8. In a machine of the type described, the combination with a pair of article clamping plungers, means for moving the plungers in opposite directions to clamp the article, means for feeding the material to be clamped thereto, means for retaining the plungers in a clamping position while an article as a stick is inserted into the material, means actuated by one of the clamping plungers for removing the finished article and stick therein after the clamping mechanism is withdrawn, including an ejector and conveyer devices for carrying away the finished article from the machine.

9. A drive mechanism for a machine of the kind described, including a shaft, a cam thereon, a bell crank lever actuated by the cam, a pair of plungers, means connecting to the opposite ends of the bell-crank lever and to the plungers, the connecting means being located at different distances form a pivotal center of the lever, whereby one plunger travels faster than the other.

10. A stick feeding mechanism comprising a hopper to receive the sticks, a delivery passage for the sticks, a pivoted member for permitting one stick at a time to be removed from the passage, a latch for permitting the stick to pass by the same in one direction only after the stick is removed and is then placed in a position for removal from the machine.

11. A stick pusher mechanism comprising a member for receiving one end of the stick, a member for receiving the other end, a cam, a roller engaging the cam, an arm carrying the roller, a rack operated from the arm for moving the member which receives the end of the stick.

12. A mechanism for inserting a stick into a piece of confection and comprising in combination with a clamping device for the confection, a hopper for containing a supply of the sticks, means for removing one stick at a time from the hopper, means for aligning the stick after its removal with the piece of confection, means for inserting the stick, means for actuating the clamping device to release the confection after the stick is inserted and means for removing the confection and its inserted stick from the machine, said last mentioned means comprising a part on the clamping device and a part pivotally attached to the machine.

13. In combination, a hopper therefor to receive a supply of sticks and having a discharge outlet, a platform on which the lowermost stick normally rests, a device for engaging this stick to remove it from the hopper and from the platform to permit it to drop onto a stick receiving member, a reciprocating member for operating the stick removing device in two directions; one to open and the other to close the hopper, a latch, the reciprocating member serving to move the stick past the latch and into a position to be removed from the machine, and means for removing the stick from the machine.

14. In combination, a hopper therefor to receive a supply of sticks and having a discharge outlet, a platform on which the lowermost stick normally rests, a device for engaging this stick to remove it from the hopper and from the platform to permit it to drop onto a stick receiving member, a reciprocating member for operating the stick removing device in two directions; one to open and the other to close the hopper, a latch, the reciprocating member serving to move the stick past the latch and into a position to be removed from the machine, and means for removing the stick from the machine, said latch also serving to prevent the return of the stick onto the stick receiving member.

15. In combination, a hopper therefor to receive a supply of sticks and having a discharge outlet, a platform on which the lowermost stick normally rests, a device for engaging this stick to remove it from the hopper and from the platform to permit it to drop onto a stick receiving member, a reciprocating member for operating the stick removing device in two directions; one to open and the other to close the hopper, a latch, the reciprocating member serving to move the stick past the latch and into a position to be removed from the machine, and means for removing the stick from the machine, said stick removing means including a member which is actuated with the reciprocating member.

16. In a machine for the purpose described, the combination with a cam, an operating shaft on which the cam is located, said cam having two operating surfaces on which rollers travel for operating a pair of plungers, one of the surfaces serving to move the plungers toward each other and the other surface serving to move the plungers away from each other and connecting mechanism between the rollers and the plungers.

17. In a machine for forming confections, means for feeding a strip of confection into the machine including a pair of rollers, a die plate over which the strip of confection is fed, a pair of plungers cooperating with the die plate to move a portion of the confection into the die plate for forming or shaping the finished article, means for actuating the plungers including a cam link mechanism between the plungers and the cam, the cam having two operating surfaces one for moving the plungers toward each other and the other for separating the plungers, the latter surface acting in a direction that is radial to the cam and the former surface in a direction that is lateral.

18. In combination, a shaft, a cam thereon having two cam surfaces, a pair of plungers, a bell crank lever, connecting mechanism between the plungers and the bell crank lever, two rollers on the said lever for engaging the cam tracks, the cam surface being so arranged that during a portion of its rotation one of the cam surfaces will cause the plungers to move toward each other and during the remainder of its rotation the plungers will move away from each other, said cam surfaces each having a part which imparts a dwell or rest in the movements of the plungers at the respective ends of its travel.

19. In combination, a main shaft, a member thereon formed with two cam tracks, a lever, two rollers on the lever, one roller engaging one of the tracks and the other roller engaging the other track, two reciprocating members, connecting devices between the members and the lever, the formation and location of the cam tracks being such that when the member is rotated the two reciprocating members will be moved towards each other during a portion of the rotation and during the remainder of the rotation the members will be moved away from each other, and rest periods during the operation of the member.

20. In a confection molding machine, in combination, a stationary table, means for intermittently feeding a bar of confection material onto and over said table, means for severing a piece of confection from the bar, vertically movable presser means for molding said piece of confection, side presser means movable substantially at right angles to the vertical presser means in order to clamp the sides of the confection and means for operating said movable elements in properly timed relation.

21. In a confection machine, in combination, a molding mechanism, means for feeding confection material beneath the molding mechanism, means for pressing the sides of the confection while it is held by the molding mechanism, means for operating the molding mechanism and side pressers and means for inserting a stick into the confection, while held by the molding mechanism and side pressers.

22. In a candy forming machine, in combination, a table, a plunger movable in said table, means for feeding candy material over said plunger, a second plunger movable vertically over said first mentioned plunger, means for moving both said plungers towards each other to compress the candy between them and means for compressing the sides of the candy, said last mentioned means being operable substantially at right angles to the said plungers.

FRANCESCO GIGLIOTTI.